(12) United States Patent
Wakumoto

(10) Patent No.: US 8,159,948 B2
(45) Date of Patent: Apr. 17, 2012

(54) METHODS AND APPARATUS FOR MANY-TO-ONE CONNECTION-RATE MONITORING

(75) Inventor: Shaun K. Wakumoto, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 11/827,398

(22) Filed: Jul. 11, 2007

(65) Prior Publication Data

US 2009/0016221 A1    Jan. 15, 2009

(51) Int. Cl.
*H04L 12/26* (2006.01)

(52) U.S. Cl. .................................. 370/233; 370/352

(58) Field of Classification Search .................. 370/352, 370/229, 94.2, 241
See application file for complete search history.

(56) References Cited

U.S. PATENT DOCUMENTS

| | | | | |
|---|---|---|---|---|
| 5,539,747 | A * | 7/1996 | Ito et al. ................... | 370/235 |
| 6,587,432 | B1 * | 7/2003 | Putzolu et al. ............. | 370/229 |
| 2002/0101819 | A1 * | 8/2002 | Goldstone .................. | 370/229 |
| 2006/0077964 | A1 * | 4/2006 | Wu et al. ..................... | 370/352 |
| 2006/0233115 | A1 * | 10/2006 | Matityahu et al. ......... | 370/252 |
| 2007/0237091 | A1 * | 10/2007 | Lin et al. .................... | 370/252 |
| 2007/0286085 | A1 * | 12/2007 | Rabinovitch ............... | 370/241 |

OTHER PUBLICATIONS

Matthew M. Williamson, "Throttling Viruses: Restricting Progapation to Defeat Malicious Mobile Code", Jun. 17, 2002, pp. 1-6.
Matthew M. Williamson, "Virus Throttling", Virus Bulletin Ltd., Mar. 2003, pp. 8-11.
Joris De Schutter, et al., "Kalman Filters: A Tutorial", Journal A, vol. 40 (4), Dec. 1999, pp. 52-59.
"Connection-Rate Filtering Based on Virus-Throttling Technology", ProCurve Networking HP Innovation, Jun. 2005.

* cited by examiner

*Primary Examiner* — Kwang B Yao
*Assistant Examiner* — Syed M Bokhari

(57) ABSTRACT

One embodiment relates to a network device configured with many-to-one connection-rate monitoring. The network device includes sampling circuitry configured to sample packets from a port and a software-implemented agent. The agent is configured to receive the sampled packets and to determine a number of distinct sources for each destination in the sampled packets. Another embodiment relates to a method of many-to-one connection-rate monitoring. A rate of traffic at a port of a network device is measured, and the measured traffic rate is compared with a pre-set threshold rate. If the pre-set threshold rate is exceeded by the measured traffic rate, then packets from the port are sampled over a period of time. The sampled packets are analyzed to detect a high rate of connections to a single destination. Other embodiments, aspects and features are also disclosed herein.

19 Claims, 5 Drawing Sheets

METHODS AND APPARATUS FOR MANY-TO-ONE CONNECTION-RATE MONITORING

BACKGROUND OF THE INVENTION

1. Field of the Invention

The present invention relates generally to computer networking and computer software.

2. Description of the Background Art

Computer Viruses and Virus Throttling

Malicious forms of computer code include computer viruses. A computer virus is typically able to copy itself and infect a host computer. The virus may be spread from host computer to host computer by way of a network or other means. Antivirus software typically runs on a computer host so as to attempt to protect the computer host from becoming infected. Antivirus software typically uses signature-based techniques.

Virus throttling or connection-rate filtering is a technique for containing the damage caused by fast-spreading worms and viruses. Rather than attempting to prevent a computer host from becoming infected, virus throttling inhibits the spreading of the worm or virus from an infected machine. This reduces damage because the worm or virus is able to spread less quickly, and this also reduces the network traffic caused by such worms and viruses.

Virus throttling is based on controlling an infected machine's network behavior, and so does not rely on details of the specific virus. In other words, a virus signature is not needed to implement virus throttling. Although virus throttling does not prevent infection in the first place, it helps to contain damage by restricting the spread of the virus. With such throttling, a virus or worm outbreak will grow less rapidly, and the network load will be reduced. Further, by damping down the spread of the virus or worm, the throttling buys time for signature-based solutions to reach machines before the virus or worm.

Virus throttling technology has been implemented, for example, in the ProCurve® Switch 5300xl available from the Hewlett Packard Company. Virus throttling typically works by monitoring connection requests at the networking layer 3 or layer 2 levels. When a given host exceeds a certain number of unique connection requests within a specific amount of time, the networking device may consider this host to be infected by malicious code (such as a virus or worm) and may take appropriate actions.

DETAILED DESCRIPTION

Limitations of Virus Throttling

As discussed above, virus throttling is useful to detect and deal with cases where a host (source) is infected with a virus and is trying to spread itself to many other hosts (many destinations). However, applicant points out in the present application that conventional virus throttling is not useful to detecting cases where many hosts are trying to connect to a single host Applicant believes that detecting cases where many hosts (many sources) are trying to connect to a single host (destination) is also very useful. Detecting such cases may be useful, for example, in finding a BOT server, detecting a distributed denial of service attack, or a game server.

A BOT server is a software server "robot" or "bot" which runs autonomously. In some cases, a BOT server may scan its environment and propagate itself by exploiting network vulnerabilities.

A distributed denial of service attack is a coordinated attempt to prevent legitimate users from using a service. The coordinated attack may involve, for example, sending a large number of IP packets with the source address faked to appear to be the IP address of the host under attack. Many other forms of denial of service attacks also exist.

A game server may be used, for example, to enable a video game to be played over the Internet. Game servers often take up an undesirably large amount of bandwidth due to the large number of game clients which require connections and the large amount of data that may be communicated between the many game clients and a game server.

Methods and Apparatus for Many-to-One Connection Rate Monitoring

The present application discloses innovative methods and apparatus for many-to-one connection-rate monitoring. The methods and apparatus disclosed herein incorporate many-to-one connection-rate monitoring into the network infrastructure.

In one embodiment, the many-to-one connection-rate monitoring may be added at an edge switch (or router) of a network so as to monitor connections to an end host that connects to one of the switch/router's edge ports. Such many-to-one connection-rate monitoring by the edge switch (or router) provides a best viewpoint because all traffic destined to the end host must pass through the edge port. The switch (or router) may copy all new flows up to the switch CPU and monitor all new connections so as to detect especially high rates of new connections to a single destination. When such an event is detected, the switch (or router) may transmit a notification to an administrator and/or prevent new connections to that end node.

Figure 1:
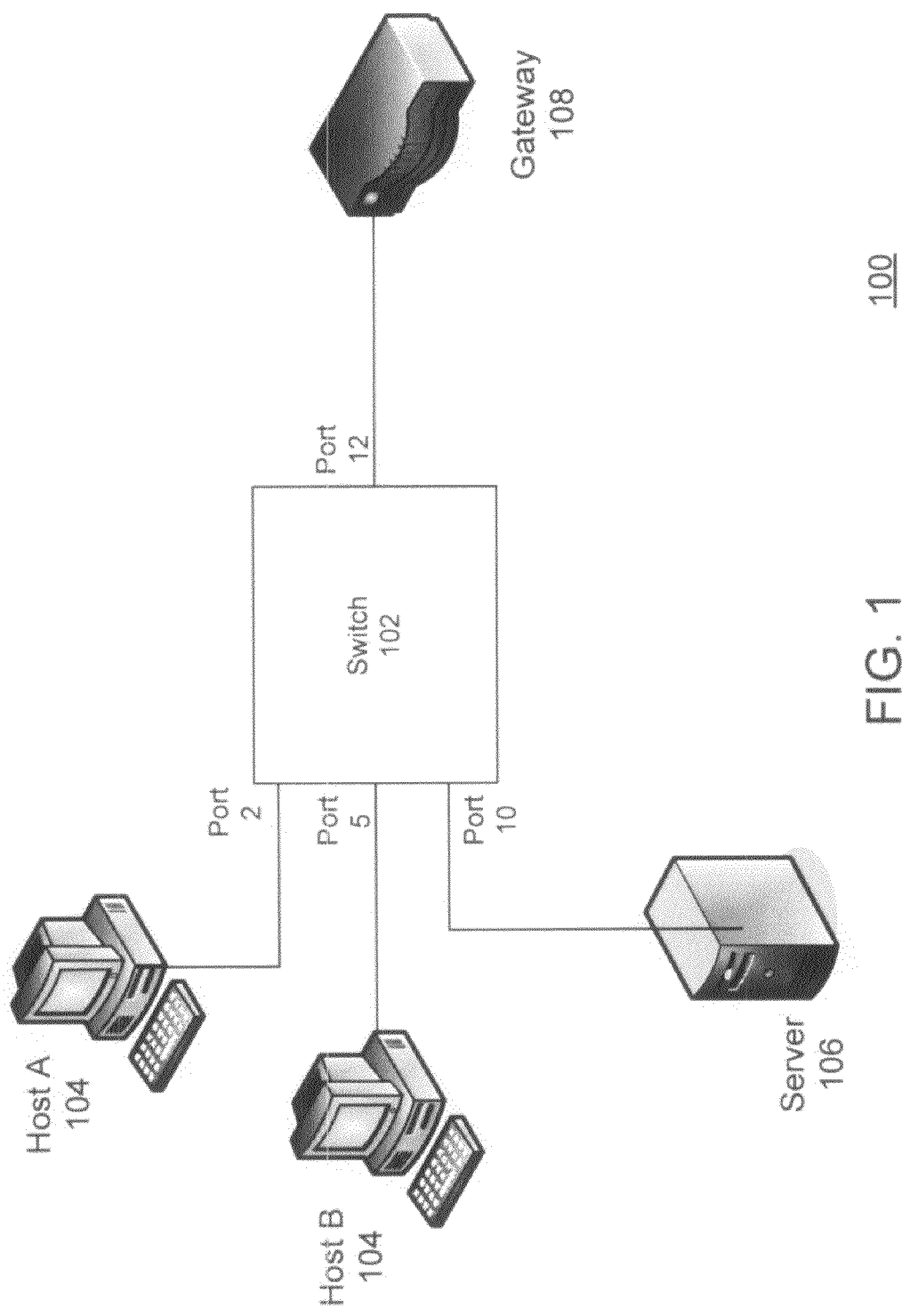
FIG. 1 is a schematic diagram depicting an example network system in which many-to-one connection-rate monitoring may be implemented in accordance with an embodiment of the invention.

FIG. 1 is a schematic diagram depicting an example network system in which many-to-one connection-rate monitoring may be implemented in accordance with an embodiment of the invention. In this example, the switching apparatus 102 is depicted as being connected via port 2 to Host A 104, via port 5 to Host B 104, via port 10 to Server 106, and via port 12 to Gateway 108.

In accordance with one embodiment, connection-rate monitoring may be performed at the networking layer 2 level. This may be accomplished, for example, by monitoring new internet protocol (IP) flows that are switched through the switching apparatus 102.

In accordance with an alternate embodiment, connection-rate monitoring may be performed at the network layer 3 level by a network device with layer 3 routing capabilities. This may be accomplished, for example, by programming new source/destination traffic streams into a route table of recent connections. Such a route table of recent connections may be used to determine the number of unique connections that a given source has been trying to make in a recent period of time and also to determine the number of unique connections attempted to be made to a given destination in a recent period of time.

Figure 2:
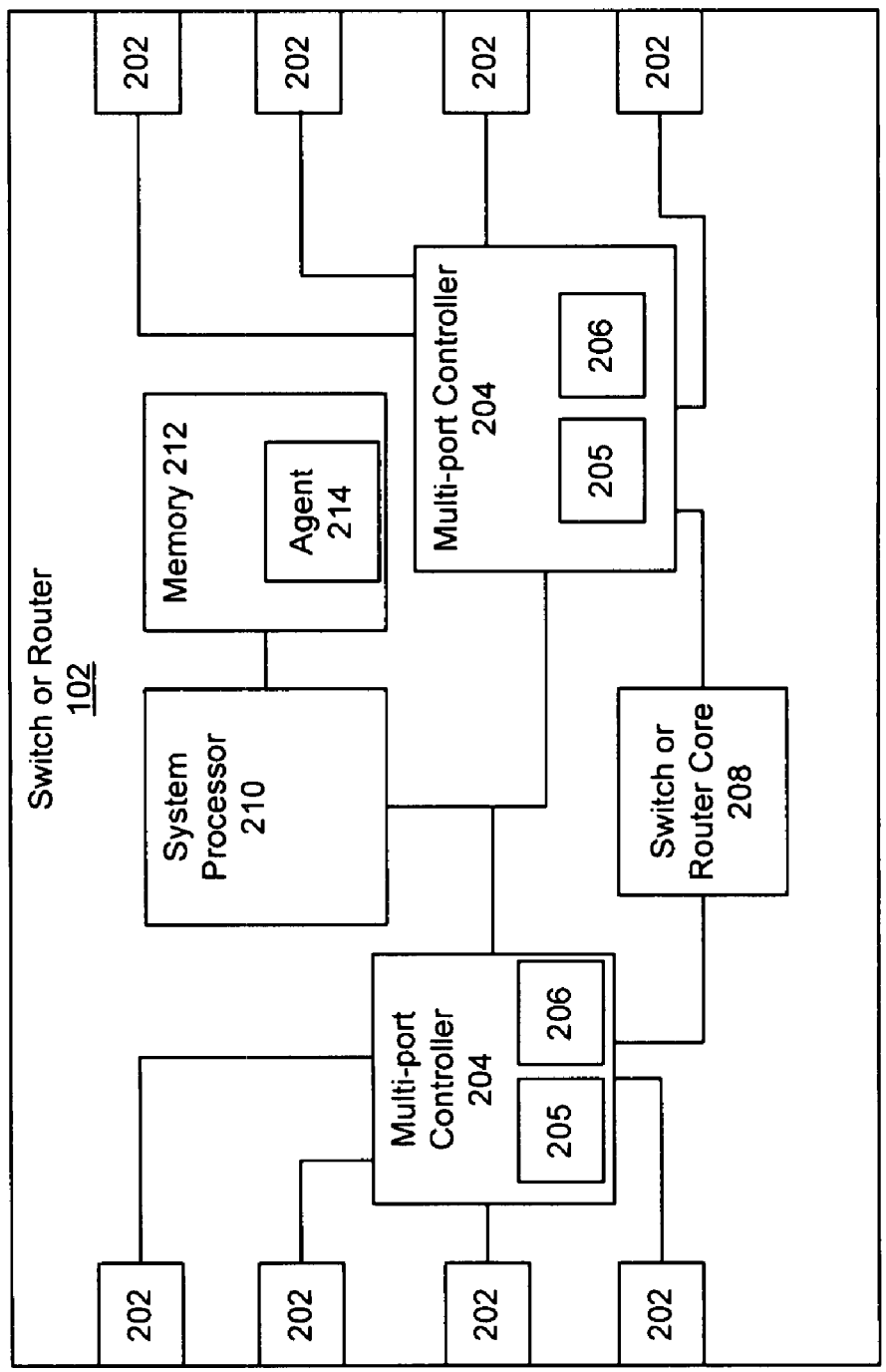
FIG. 2 is a schematic diagram of a switching apparatus configured for many-to-one (and one-to-many) connection-rate monitoring in accordance with an embodiment of the invention.

FIG. 2 is a schematic diagram of a switching or routing apparatus configured for many-to-one (and one-to-many) connection-rate monitoring in accordance with an embodiment of the invention. The switching or routing apparatus 102 may be configured with multiple ports 202. The ports 202 may be controlled by one or more controller ASICs (application specific integrated circuits) 204. The controller ASICs 204 may include metering circuitry 205 and sampling circuitry 206.

The apparatus 102 may transfer (i.e. "switch" or "route") packets between ports by way of a conventional switch or router core 208 which interconnects the ports. A system processor 210 and memory 212 may be used to control the apparatus 102. For example, an agent 214 may be implemented as code in memory 212 which is being executed by the system processor 210 of the apparatus 102.

Figure 3:
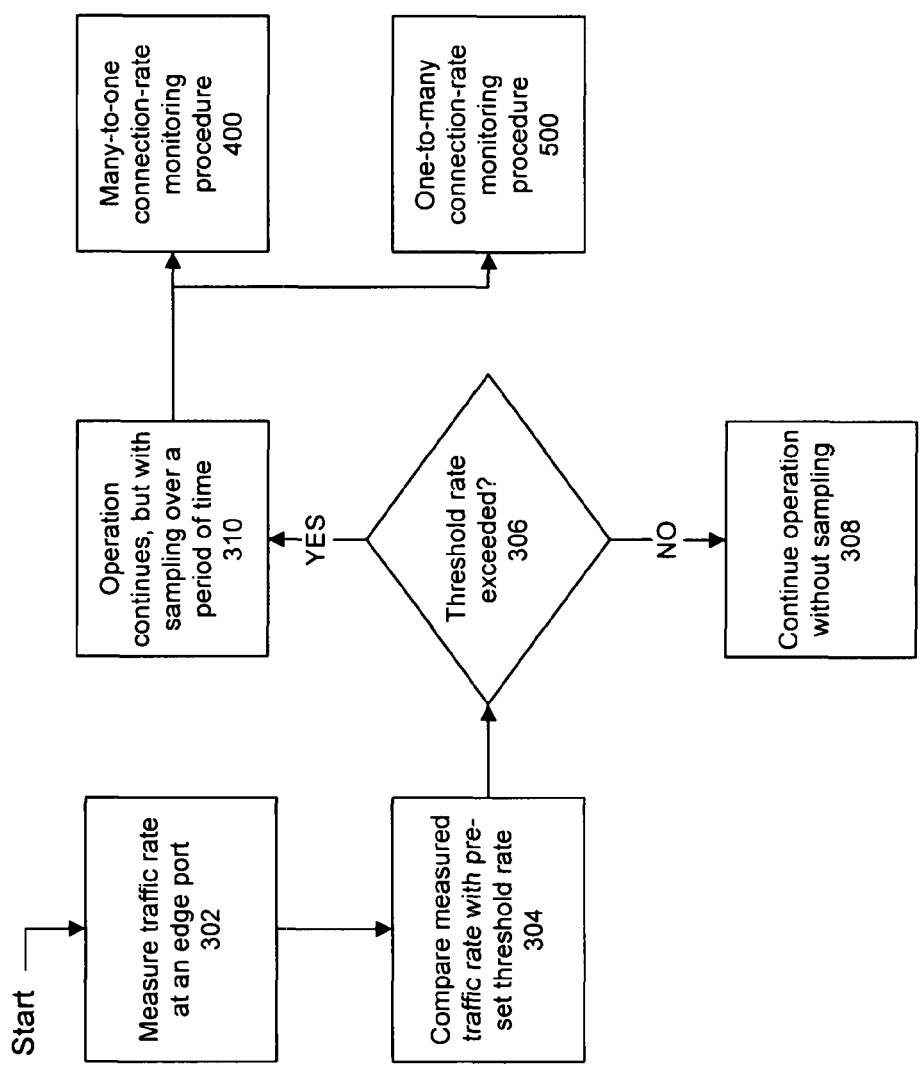
FIG. 3 is a flow chart depicting a method for metering and sampling traffic for many-to-one (and one-to-many) connection-rate monitoring in accordance with an embodiment of the invention.

FIG. 3 is a flow chart depicting a method 300 for metering and sampling traffic for many-to-one (and one-to-many) connection-rate monitoring in accordance with an embodiment of the invention. A network apparatus (such as switch or router apparatus 102) may be configured to meter 302 packets from a given edge port 202.

For example, the apparatus 102 shown in FIGS. 1 and 2 may measure the rate of packets being transmitted out (i.e. the egress traffic rate) on port number 2 (which is connected to Host A 104). The metering 302 may be performed, for example, by metering circuitry 205 within a multi-port controller 204 connected to that given port 202.

The measured traffic rate may then be compared 304 against a pre-set threshold rate. The threshold rate may be configurable by a network administrator or other user. The comparison may be performed, for example, by circuitry and/or code within the controller 204.

If it is determined 306 that the threshold rate is not exceeded, then operation continues without sampling 308 (as would normally be done without connection-rate metering). In this normal operation, the packets may be switched or routed to their destinations, for example, by way of a conventional switch or router core 208 which interconnects the ports.

Otherwise, if it is determined 306 that the threshold rate is exceeded, then operation continues but with sampling over a period of time 310. In other words, a sampling mode may be turned on or enabled for a period of time. The sampling period (i.e. the period during which the port is set in sampling mode) may be, for example in a range of ten to fifteen seconds. The sampling may be performed, for example, by sampling circuitry 206 within the controller 204. The sampling may be achieved, for example, by forwarding every "nth" (for example, every tenth) packet up to the software-implemented agent 214.

The software-implemented agent 214 may be configured to analyze the sampled packets. Although only a portion of the traffic of interest may sampled, the sampled traffic may be taken as representative of the traffic of interest.

Of particular interest regarding the present application, the agent 214 may be configured to perform a many-to-one connection-rate monitoring procedure 400. In addition, the agent 214 may be also configured to perform a one-to-many connection-rate monitoring procedure 500. Example procedures 400 and 500 are discussed below in further detail in relation to FIGS. 4 and 5, respectively.

Figure 4:
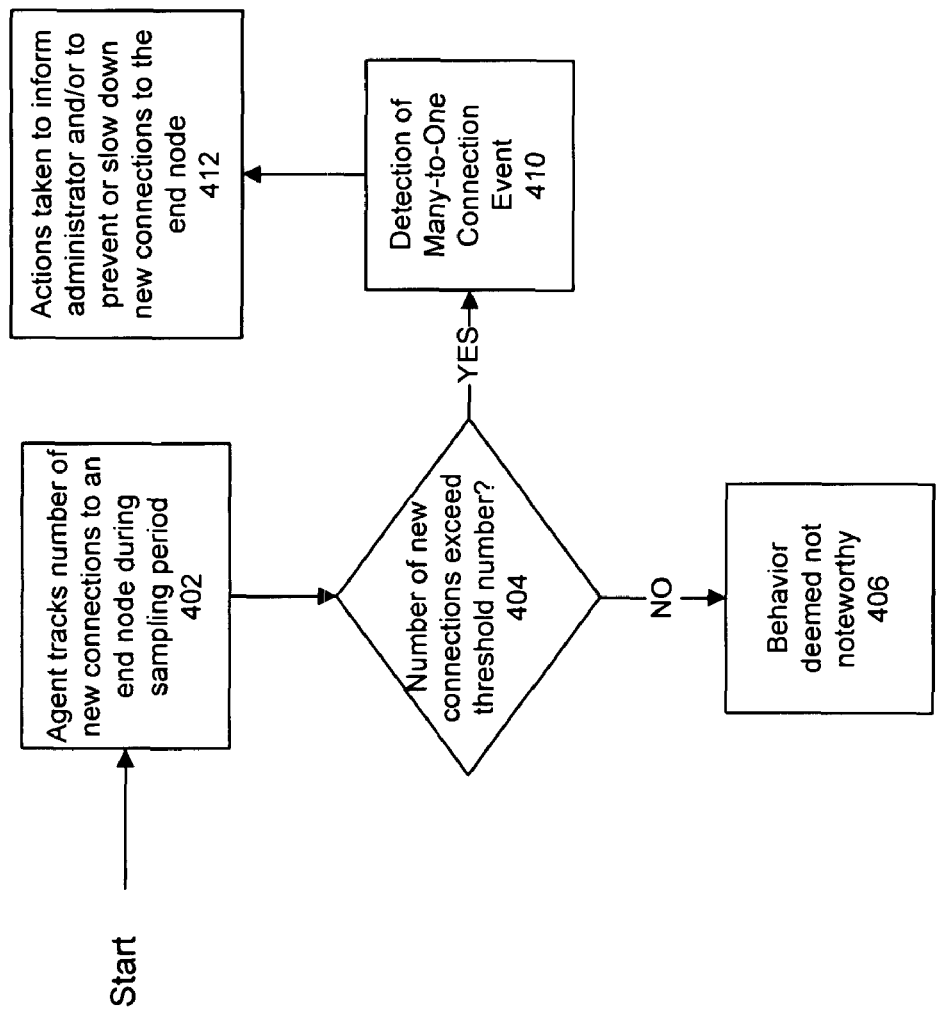
FIG. 4 is a flow chart depicting a many-to-one connection-rate monitoring procedure in accordance with an embodiment of the invention.

FIG. 4 is a flow chart depicting a many-to-one connection-rate monitoring procedure 400 in accordance with an embodiment of the invention. As discussed above in relation to FIG. 3, the many-to-one connection-rate monitoring procedure 400 may be performed after metering and sampling traffic. Alternatively, the many-to-one connection-rate monitoring procedure 400 may be performed by a switch or router without requiring the specific steps discussed above in relation to FIG. 3.

In a first step 402, a software-implemented agent 214 may track or count 402 the number of new connections to an end node during a sampling period. In other words, the agent may track the number of distinct sources for connections to a given destination host in the sampled communications.

If it is determined 404 that the number of new connections to an end node (i.e. the number of distinct sources connecting to that destination) does not exceed the threshold number, then the "behavior" of the source host may be deemed as not noteworthy 406. Thereafter, in reference to FIG. 3, the port may be removed from sampling mode and metering may be resumed after a pre-set delay. The pre-set delay may be, for example, for a few minutes. The pre-set delay advantageously allows the benign behavior to play itself out such that unnecessary repeated sampling may be avoided.

On the other hand, if it is determined 404 that the number of new connections to an end node (i.e. the number of distinct sources connecting to that destination) does exceed the threshold number, then a many-to-one connection event may be deemed to have occurred 410. Hence, actions may be taken 412 to inform a network administrator of the event and/or to prevent or slow down new connections to that end node. New connections may be prevented or slowed down by blocking traffic to the end node. The blocking may be for a temporary pre-determined period of time or may continue until a command is received from a user to unblock traffic to that destination.

Figure 5:
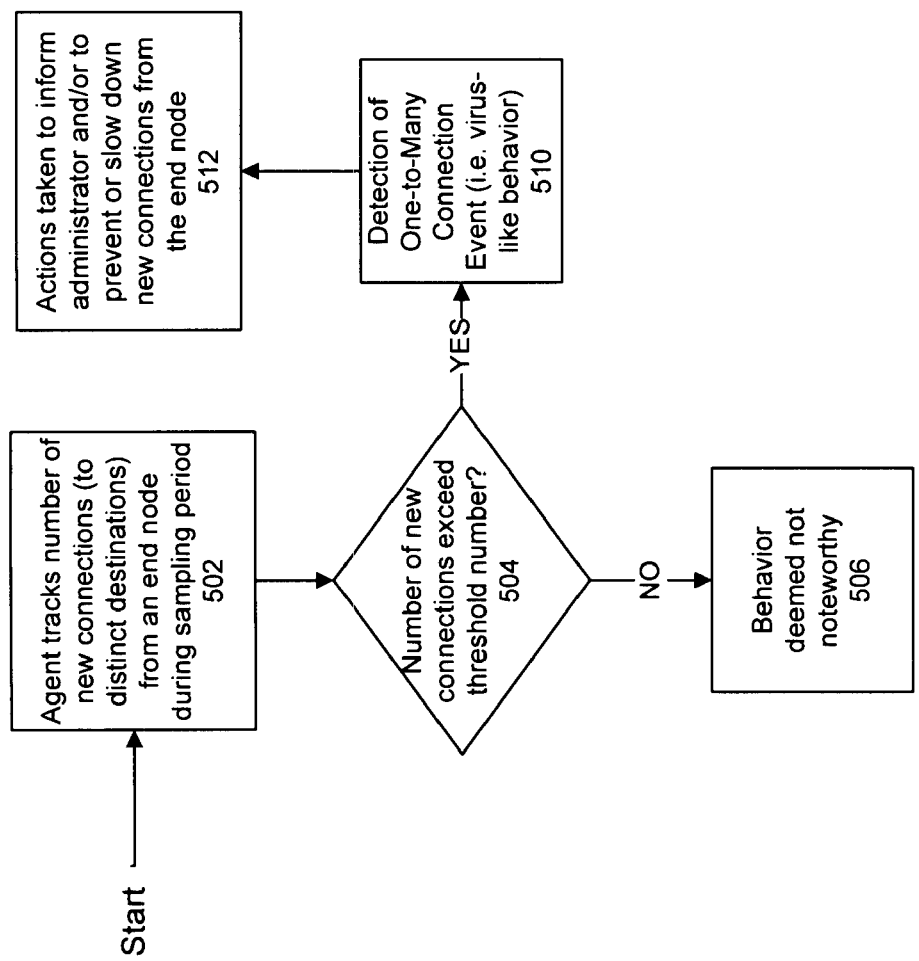
FIG. 5 is a flow chart depicting a one-to-many connection-rate monitoring procedure in accordance with an embodiment of the invention.

FIG. 5 is a flow chart depicting a one-to-many connection-rate monitoring procedure 500 in accordance with an embodiment of the invention. Such a one-to-many connection-rate monitoring procedure 500 may be performed in addition to a many-to-one connection-rate procedure 400.

In a first step 502, a software-implemented agent 214 may track or count 502 the number of distinct destinations for connections originating from a given source host in the sampled communications received during the sampling period.

If it is determined 504 that the number of distinct destinations in the sampled traffic from a given source host does not exceed the threshold number, then the "behavior" of the source host may be deemed as not noteworthy (in other words, benign) 506. Thereafter, the port may be removed from sampling mode and metering may be resumed after a pre-set delay. The pre-set delay may be, for example, for a few minutes. The pre-set delay advantageously allows the benign behavior to play itself out such that unnecessary repeated sampling may be avoided.

On the other hand, if it is determined 504 that the number of distinct destinations in the sampled traffic from a given source host does exceed the threshold number, then a one-to-many connection event may be deemed to have occurred 510. As such, the "behavior" of the source host may be identified as exhibiting virus-like (suspicious) behavior. Further, the suspiciously-behaving host (i.e. the source address) may be flagged 512 by the agent 214 as appearing to be infected by malicious code.

Further methodology or action may be applied once a host is flagged as potentially infected. For example, a notification may be sent indicating that a specific source is exhibiting potentially malicious behavior, and/or traffic from the specific source may be blocked by the connection-rate filtering apparatus.

In one implementation, the blocking of traffic may be for a temporary period of time to slow down spreading of malicious code. In another implementation, the blocking of traffic may continue until a command is received from a user to unblock traffic from the specific source.

Conclusion

As described above, embodiments of the present invention relate to methods and apparatus for many-to-one connection-rate monitoring. While a detailed description is given above of an implementation using hardware circuitry for metering and sampling and a software agent for monitoring analysis, other implementations are contemplated. For example, instead of using hardware circuitry to perform various functions, software instructions executed by a processor or controller of the apparatus may be used to perform those functions, and vice versa.

The following are advantages of some embodiments of the invention. First, no special monitoring software has to be installed and maintained on the host computers in order to monitor a network. Second, while hosts undergoing denial of service attacks may be unable to process packets and notify a network administrator of the event, a network infrastructure device is not so hindered and would be able to notify the network administrator of the event. Third, BOT masters and game servers are detectable by a network infrastructure device without relying on cooperation of the host computer.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim 1nterpretation.

What is claimed is:

1. A method of many-to-one connection-rate monitoring, the method comprising:
    sending traffic through a port of a network device;
    measuring a rate of the traffic at the port of the network device;
    comparing the measured traffic rate with a threshold rate;
    sampling packets from the port over a period of time while continuing to send the traffic through the port, if the threshold rate is exceeded by the measured traffic rate; and
    counting a number of distinct sources for each destination in the sampled packets.

2. The method of claim 1, further comprising determining if the number of distinct sources for a specific destination exceeds a threshold number of distinct sources.

3. The method of claim 2, further comprising, if the number of distinct sources of a specific destination exceeds said threshold number, then sending a notification indicating that the specific destination is receiving a high rate of connections thereto.

4. The method of claim 2, further comprising, if the number of distinct sources of a specific destination exceeds said threshold number, then blocking traffic to the specific destination.

5. The method of claim 4, wherein the blocking is for a temporary period of time.

6. The method of claim 4, wherein the blocking continues until a command is received to unblock traffic to the specific destination.

7. The method of claim 1, wherein the rate of traffic comprises an egress traffic rate.

8. A method of connection-rate monitoring by a network device, the method comprising:
    sending traffic through a port of the network device;
    measuring a rate of the traffic at the port of the network device;
    sampling packets from the port over a period of time while continuing to send the traffic through the port, if the measured traffic rate exceeds a threshold rate;
    performing a many-to-one connection-rate monitoring procedure to detect a rate of connections to a single destination from the sampled packets, including counting a number of distinct sources for each destination; and
    performing a one-to-many connection-rate monitoring procedure to detect a rate of connections from a single source from the sampled packets. for each destination in the sampled packets.

9. The method of claim 8, further comprising:
    determining if the number of distinct sources for a specific destination exceeds a threshold number of distinct sources.

10. The method of claim 9, wherein performing said one-to-many connection-rate monitoring procedure comprises counting a number of distinct destinations for each source in the sampled packets, and determining if a threshold number of distinct destinations is exceeded by the number of distinct destinations for each source.

11. The method of claim 9, further comprising, if the number of distinct sources for a specific destination exceeds said threshold number of distinct sources, then sending a notification indicating that the specific destination is receiving a high rate of connections thereto and blocking traffic to the specific destination.

12. The method of claim 10, further comprising, if said threshold number of distinct destinations, then setting a flag indicating that a specific source is generating a high rate of connections.

13. A network device configured with many-to-one connection-rate monitoring, the device comprising:
    a plurality of ports;
    metering circuitry to send traffic through one of the plurality of ports and to measure a rate of the traffic at the one of the plurality of ports;
    sampling circuitry to sample packets from the one of the plurality of ports while the traffic is continued to be sent through the one of the plurality of ports, if a threshold rate is exceeded by the measured traffic rate; and a software-implemented agent, stored in a computer-readable storage medium, to receive the sampled packets and to determine a number of distinct sources for each destination in the sampled packets.

14. The device of claim 13, wherein the software-implemented agent is further to determine if a threshold number of distinct sources is exceeded by the number of distinct sources for each destination.

15. The device of claim 14, wherein, if a threshold number is exceeded by the number of distinct sources for a specific destination, the software-implemented agent is further to send a notification indicating that the specific destination is receiving a high rate of connections thereto.

16. The device of claim 14, wherein the software-implemented agent is further to block traffic to a specific destination if the threshold number is exceeded by the number of distinct sources for the specific destination.

17. The device of claim 13, wherein the software-implemented agent is further to determine a number of distinct destinations for each source in the sampled packets.

18. The device of claim 17, wherein the software-implemented agent is further to determine if a threshold number of distinct destinations is exceeded by the number of distinct destinations for a source.

19. The device of claim 18, wherein the software-implemented agent is further to set a flag indicating that a specific source is generating a high rate of connections.

* * * * *

UNITED STATES PATENT AND TRADEMARK OFFICE
CERTIFICATE OF CORRECTION

| | |
|---|---|
| PATENT NO. | : 8,159,948 B2 |
| APPLICATION NO. | : 11/827398 |
| DATED | : April 17, 2012 |
| INVENTOR(S) | : Shaun K. Wakumoto |

It is certified that error appears in the above-identified patent and that said Letters Patent is hereby corrected as shown below:

In the Claims:

In column 6, lines 38-39, in Claim 8, after "packets." delete "for each destination in the sampled packets.".

Signed and Sealed this
Eighteenth Day of June, 2013

Teresa Stanek Rea
*Acting Director of the United States Patent and Trademark Office*